US011222638B2

(12) United States Patent
Nakanishi et al.

(10) Patent No.: US 11,222,638 B2
(45) Date of Patent: Jan. 11, 2022

(54) COMMUNICATION DEVICE AND CONTROL PROGRAM FOR COMMUNICATION DEVICE

(71) Applicant: Toyota Jidosha Kabushiki Kaisha, Toyota (JP)

(72) Inventors: Ryosuke Nakanishi, Tokyo-to (JP); Mina Funazukuri, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 116 days.

(21) Appl. No.: 16/661,495

(22) Filed: Oct. 23, 2019

(65) Prior Publication Data
US 2020/0135197 A1 Apr. 30, 2020

(30) Foreign Application Priority Data
Oct. 25, 2018 (JP) .............................. JP2018-200832

(51) Int. Cl.
*G10L 15/22* (2006.01)
*G10L 15/18* (2013.01)
(Continued)

(52) U.S. Cl.
CPC .............. *G10L 15/22* (2013.01); *G06F 40/30* (2020.01); *G06N 3/008* (2013.01);
(Continued)

(58) Field of Classification Search
CPC . G10L 15/1815; G10L 15/1822; G10L 15/22; G10L 15/28; G10L 2015/225;
(Continued)

(56) References Cited

U.S. PATENT DOCUMENTS

| 6,224,383 B1 * | 5/2001 | Shannon .................. G09B 7/04 434/156 |
| 6,883,014 B1 * | 4/2005 | McErlean .............. G06Q 10/10 707/999.01 |

(Continued)

FOREIGN PATENT DOCUMENTS

| JP | 2010-140282 A | 6/2010 |
| JP | 2017-102247 A | 6/2017 |

(Continued)

*Primary Examiner* — Eric Yen
(74) *Attorney, Agent, or Firm* — Dinsmore & Shohl LLP

(57) ABSTRACT

A communication device includes a calculation unit which calculates class probabilities that are probabilities an input speech belongs to a plurality of respective classified classes previously defined as types of speech contents, a plurality of response generation modules provided for respective types of responses each generates a response speech corresponding to the type, a determination unit which selects one of the plurality of response generation modules based on association probabilities and the class probabilities calculated by the calculation unit and determines the response speech generated by the selected response generation module as an output speech to be emitted to the user, the association probabilities being set for each of the plurality of response generation modules, and the association probabilities each indicating a level of association between the response generation module and each of the plurality of classified classes, and an output unit which outputs the output speech.

5 Claims, 8 Drawing Sheets

(51) Int. Cl.
  *G06N 3/00* (2006.01)
  *G10L 15/28* (2013.01)
  *G06F 40/30* (2020.01)
(52) U.S. Cl.
  CPC ...... G10L 15/1815 (2013.01); G10L 15/1822 (2013.01); G10L 15/28 (2013.01); *G10L 2015/225* (2013.01); *G10L 2015/228* (2013.01)
(58) Field of Classification Search
  CPC ... G10L 2015/228; G06F 40/56; G06F 40/30; G06N 3/008; H04L 51/02
  See application file for complete search history.

(56) References Cited

U.S. PATENT DOCUMENTS

| | | | | |
|---|---|---|---|---|
| 2004/0044516 | A1* | 3/2004 | Kennewick | G10L 15/22 704/5 |
| 2009/0209345 | A1* | 8/2009 | Okada | A63F 13/79 463/36 |
| 2013/0326375 | A1* | 12/2013 | Barak | G06Q 30/0201 715/758 |
| 2015/0100528 | A1* | 4/2015 | Danson | G06N 5/04 706/21 |
| 2016/0336024 | A1* | 11/2016 | Choi | G06F 3/167 |
| 2017/0169824 | A1* | 6/2017 | Bodell | G10L 15/22 |
| 2018/0060786 | A1* | 3/2018 | Venkataraman | G06Q 30/016 |
| 2018/0276201 | A1* | 9/2018 | Choi | G06N 3/0454 |
| 2019/0205386 | A1* | 7/2019 | Kumar | G06F 40/30 |
| 2020/0044999 | A1* | 2/2020 | Wu | G06F 16/3329 |

FOREIGN PATENT DOCUMENTS

| | | |
|---|---|---|
| JP | 2018-041124 A | 3/2018 |
| JP | 2018-132704 A | 8/2018 |

\* cited by examiner

ASSOCIATION PROBABILITY REFERENCE TABLE

|  | QUESTION | INFORMATION PROVISION | REQUEST | NON-DIALOGUE |
|---|---|---|---|---|
| QUESTION RESPONSE GENERATION MODULE | 70% | 15% | 10% | 5% |
| ASSOCIATIVE RESPONSE GENERATION MODULE | 10% | 40% | 20% | 30% |
| EXAMPLE RESPONSE GENERATION MODULE | 5% | 35% | 10% | 50% |
| SYMPATHETIC RESPONSE GENERATION MODULE | 10% | 30% | 20% | 40% |
| IMITATION RESPONSE GENERATION MODULE | 15% | 30% | 35% | 20% |

Fig. 3

COMMUNICATION DEVICE AND CONTROL PROGRAM FOR COMMUNICATION DEVICE

CROSS REFERENCE TO RELATED APPLICATIONS

This application is based upon and claims the benefit of priority from Japanese patent application No. 2018-200832, filed on Oct. 25, 2018, the disclosure of which is incorporated herein in its entirety by reference.

BACKGROUND

The present disclosure relates to a communication device and a control program for the communication device.

There is a known technique of analyzing a user's speech to recognize a semantic content, generating a response speech according to the type of the user's speech, and presenting it to the user by a voice or a text (see, for example. Japanese Unexamined Patent Application Publication No. 2010-140282).

SUMMARY

In a speech response device of the related art, speeches in response to the user's speech become uniform, enabling a user to predict the response speech, to some extent as he/she uses the device. That is, the user cannot get a feeling of conversing with a conversation partner having life or free will from the response speech of the speech response device, and thus may get bored with having a dialogue therewith.

The present disclosure provides a communication device or the like that can be recognized by a user as a conversation partner by generating a variety of response speeches.

A first example aspect of the present disclosure is a communication device including: an input unit configured to input an input speech that is a user's speech; a calculation unit, configured to calculate class probabilities that are probabilities the input speech belongs to a plurality of respective classified classes previously defined as types of speech contents; a plurality of response generation modules provided for respective types of responses each configured to generate a response speech corresponding to the type, a determination unit configured to select one of the plurality of response generation modules based on association probabilities and the class probabilities calculated by the calculation unit and determine the response speech generated by the selected response generation module as an output speech to be emitted to the user, the association probabilities being set for each of the plurality of response generation modules, and the association probabilities each indicating a level of association between the response generation module and each of the plurality of classified classes; and an output unit configured to output the output speech. With the communication device having such a configuration, the output speech is determined the multiplication of the class probability by the association probability, the selection variation of the output speech for the input speech is increased, so that the dialogs can be diverse and unexpected.

In the above communication device, the determination unit may be configured to randomly select one response generation module having a selection probability, which is obtained by multiplying the association probability by the class probability, greater than or equal to a reference value from among the plurality of response generation modules. Such a configuration can make the dialogue more unexpected.

The determination unit may be configured to multiply a past coefficient, which is set in such a way that a probability of selecting a previously-selected response generation module becomes low, by the association probability and select one of the plurality of response generation modules. Such a configuration can effectively prevent similar response speeches from being output.

Further, in the above communication device, the determination unit may select one of the plurality of response generation modules, and then the selected response generation module may generate the response speech. When the response generation module generates the response speech after it is selected, it is possible to save unnecessary processing such that the unselected response generation module generates the response speech.

A second example aspect of the present disclosure is a control program of a communication device that causes a computer to execute: inputting an input speech that is a user's speech; calculating class probabilities that are probabilities the input speech belongs to a plurality of respective classified classes previously defined as types of speech contents; selecting one of the plurality of response generation modules based on association probabilities and the class probabilities calculated in the calculating and determining the response speech generated by the selected response generation module as an output speech to be emitted to the user, the association probabilities being set for each of the plurality of response generation modules, and the association probabilities each indicating a level of association between the response generation module and each of the plurality of classified classes; and outputting the output speech. With a communication device controlled by such a control program, the output speech is determined the multiplication of the class probability by the association probability, the selection variation of the output speech for the input speech is increased, so that the dialogs can be diverse and unexpected.

According to the present disclosure, it is possible to provide a communication device or the like that can be recognized by a user as a conversation partner by generating a variety of response speeches.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 3 is an example of a reference table which defines association probabilities;

DETAILED DESCRIPTION

Figure 1:
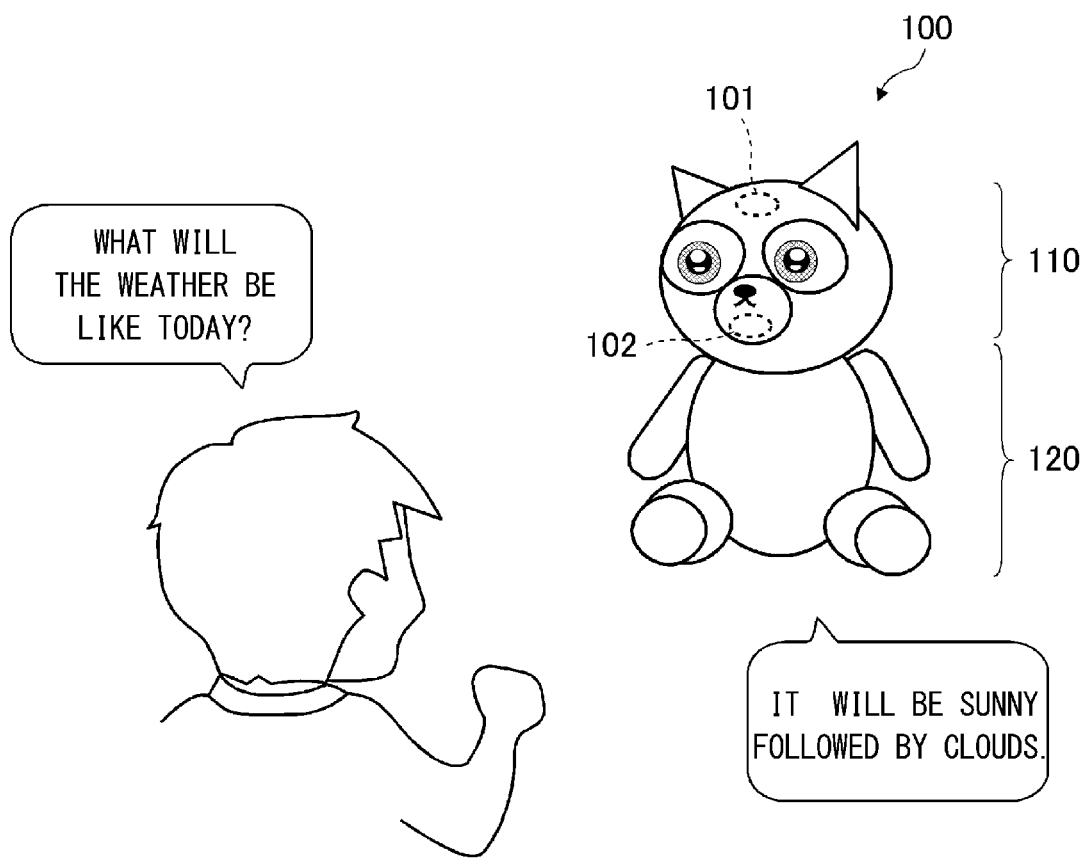
FIG. 1 is a view showing an example of communication between a robot and a user according to a first embodiment.

FIG. 1 is a view showing an example of communication between a robot 100 and a user according to a first embodiment. The robot 100 is a communication device that conducts a voice dialogue with a human being who is a user. The robot 100 is a character device that embodies a character, and may be configured to change an eye expression and a line-of-sight direction according to the dialogue.

The robot 100 imitates an appearance of an animal and has a head 110 and a body 120. A microphone 101 is disposed in a hidden manner at any position of the head 110. The microphone 101 has a function as an input unit that inputs a user's spoken voice as an input speech. A speaker 102 is disposed in a hidden manner at a position corresponding to the mouth of the robot 100. The speaker 102 has a function as an output unit that emits a voice generated by the robot 100. The user feels as if the robot 100 is talking from the voice output from the position of the mouth. As shown in the drawing, for example, when the user speaks to the robot 100 "What will the weather be like today?", then the robot 100 speaks in response, for example, "It will be sunny followed by clouds."

Figure 2:
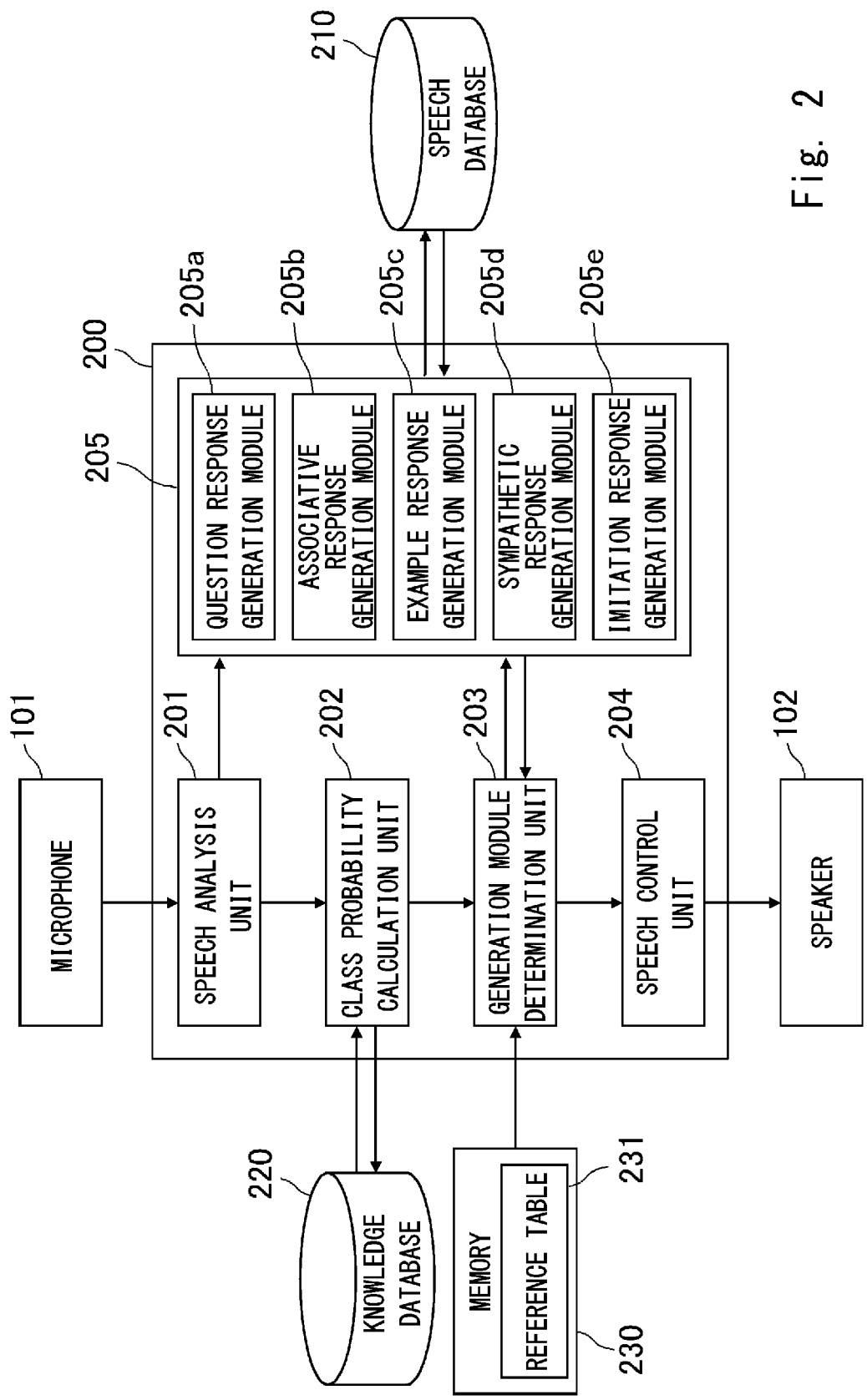
FIG. 2 is a system configuration diagram of the robot.

FIG. 2 is a system configuration diagram of the robot 100. The main system configuration of the robot 100 includes the microphone 101, the speaker 102, a control unit 200, a speech database 210, a knowledge database 220, and a memory 230. The control unit 200 is composed of, for example, a CPU. The control unit 200 also operates as a function execution unit responsible for execution of each function, and mainly operates as a speech analysis unit 201, a class probability calculation unit 202, a generation module determination unit 203, a speech control unit 204, and a response generation module group 205.

A main function of the microphone 101 is to collect voices spoken by the user who is a partner the robot 100 has a dialogue with. The microphone 101 converts the collected user's spoken voice into a voice signal, and passes the voice signal to the speech analysis unit 201 as the input speech from the user.

The speech analysis unit 201 analyzes the input speech received from the microphone 101 and converts it into a text, and recognizes the user's speech content. Specifically, the speech analysis unit 201 recognizes the user's speech content using common voice recognition technology. For example, a word analysis or the like is performed on the text of the input speech, and the speech content is recognized using a DNN model or a logistic regression model. The speech analysis unit 201 passes the recognized speech content to the class probability calculation unit 202 and the response generation module group 205.

The class probability calculation unit 202 calculates a class probability that is a probability that the input speech received from the speech analysis unit 201 belongs to each of a plurality of classified classes previously defined as types of speech contents. In this embodiment, the type of input speech is classified into four of "question", "information provision", "request", and "non-dialogue". Each of these four classifications is referred to as a classified class, and the class probability calculation unit 202 calculates the class probabilities as estimated probabilities that the input speech belongs to the "question class", "information provision class", "request class", and "non-dialogue class".

For example, the class probability of the question class is a probability that a content of the input speech is estimated that the user wants to know something. For example, when the input speech is "What will the weather be like today?" it is assumed that the user wants to know the weather today, so the class probability of the question class becomes a large value. The class probability of the information provision class is the probability that the content of the input speech is estimated to be something the user wants to convey. For example, when the input speech is "I hate vegetables", it is estimated that the user wants the robot 100 to know his/her characteristics, so the class probability of the information providing class becomes a large value.

The class probability of the request class is the probability that the content of the input speech is estimated that the user wants the robot to do something. For example, when the input speech is "Turn on the light of the living room", it is estimated that the user wants the robot 100 to transmit a control signal to turn on the light of the living room, so the class probability of the request class becomes a large value. The class probability of the non-dialogue class is the probability that the content of the input speech is estimated that it is not directed to the robot 100. For example, when the input speech is "oh, I'm sleepy", it is estimated that the user is speaking by himself/herself, so the class probability of the non-dialogue class becomes a large value.

The class probability calculation unit 202 calculates the class probabilities with reference to the knowledge database 220. The knowledge database 220 is composed of, for example, a recording medium of a hard disk drive, and, stores many words, their attributes, an analysis grammar that defines a dependency relationship between words, etc. The knowledge database 220 may not be incorporated into the robot 100, and instead may be connected to, for example, a network to which the robot 100 can be connected. The class probability calculation unit 202, for example, refers to the knowledge database 220 to determine words to be excluded from words to be considered, from among a plurality of words included in the input speech based on the number of words having the same attribute, the types of the attribute, and the analysis grammar. Then, the class probability calculation unit 202 calculates the class probability in accordance with a predetermined calculation formula. For example, the class probability calculation unit 202 outputs, in response to the input speech "What will the weather be like today?", results such as the question class probability 70%, the information provision class probability 5%, the request class probability 10%, and the non-dialogue class 15%. When the class probability calculation unit 202 outputs the class probabilities that the input speech belongs to the respective classified classes, it passes the class probabilities to the generation module determination unit 203.

Note that, instead of the analytical calculation method using the knowledge database 220, a calculation method by artificial intelligence using logistic regression or DNN (Deep Neural Network) may be employed. In this case, a learned model for outputting the class probabilities that the input speech belongs to the respective classified classes when the input speech is given thereto may be prepared. Each time the class probability calculation unit 202 receives the input. Speech from the speech analysis unit 201. It calculates the class probability using the learned model.

The response generation module group 205 is a collection of response generation modules that generate the response speeches corresponding to the set response types, in this embodiment, five types of the response types are set in advance, which are "question response", "associative response", "example response", "sympathetic response", and "imitation response". A question response generation module 205a, an associative response generation module 205b, an example response generation module 205c, a sympathetic response generation module 205d, and an imitation response generation module 205e are prepared as the response generation modules for generating the response speeches that match the respective response types.

The response question is a response type that returns an answer to the question. For example, when the input speech, is "I wonder if it rains tomorrow", the question response generation module 205a generates the response speech of "It will be sunny followed by clouds". An associative response is a response type that returns a phrase associated with an input sentence. For example, when the input speech is "I wonder if it rains tomorrow", the associative response generation module 205b generates the response speech, "Be careful not to catch a cold".

The example response is a response type that returns a phrase close to the input speech. For example, when the input speech is "I wonder if it rains tomorrow", the example response generation module 205c generates a response speech of "it is nice weather today, isn't it". The sympathetic response is a response type that returns a phrase that is considerate of the user's emotion included in the input speech. For example, when the input speech is "I wonder if it rains tomorrow", the sympathetic response generation module 205d does not generate a response speech, because the input speech does not include a word having an attribute of emotion. The imitation response is a response type that imitates a part or all of the input speech and gives a parrot-like response. For example, when the input speech is "I wonder if it rains tomorrow", the imitation response generation module 205e generates the response speech of "Tomorrow?"

Each response generation module refers to the speech database 210 to generate the response speech matching the response type. The speech database 210 is composed of, for example, a recording medium of a hard disk drive, and individual terms organized into a corpus are stored therein with reproducible speech data. The speech database 210 may not be incorporated into the robot 100, and instead may be connected to, for example, a network to which the robot 100 can be connected.

The generation module determination unit 203 selects one response generation module from the response generation module group 205 based on the class probabilities received from the class probability calculation unit 202 and association probabilities obtained by reading a reference table 221 stored in the memory 230. The specific selection method will be described later. The generation module determination unit 203 acquires the response speech generated by the selected response generation module from the selected response generation module, and determines to employ it as an output speech.

The speech control unit 204 converts the received response speech sentence into a voice signal and passes the voice signal to the speaker 102. The speaker 102 receives the voice signal converted by the speech control unit 204, and outputs an output speech as a voice. The memory 230 is a no storage medium such as a flash memory. The memory 230 stores. In addition to the reference table 231, a control program for controlling the robot 100, various parameter values used for control and calculation, functions, and lookup tables, etc.

FIG. 3 is an example of the reference table 231 which defines the association probabilities. The association probability is a value that is set for each of the response generation modules and indicates an association level for each of the above-described classified classes. For example, for the question response generation module 205a, the association probability with the question class is defined as 70%, the association probability with the information provision class is defined as 15%, the association probability with the request class is defined as 10%, and the association probability with the non-dialogue class is defined as 5%. Likewise, for each of the associative response generation module 205b, the example response generation module 205c, the sympathetic response generation module 205d, and the imitation response generation module 205e, the association probability with the question class, the association probability with the information provision class, the association probability with the request class, and the association probability with the non-dialogue class are defined.

The generation module determination unit 203 calculates a selection probability by multiplying the class probability of each classified class received from the class probability calculation unit 202 by each association probability of the reference table 231. For example, the selection probabilities of the question response generation module 205a for the class probabilities calculated as the question class probability 50%, the information provision class probability 25%, the request class probability 10%, and the non-dialogue class probability 15% when the probability to be calculated is expressed by P (response generation module|classified class) are:

$P$(question response|question)=70%×50%=35%

$P$(question response|information provision)=15%× 25%=3.75%

$P$(question response|request)=10%×10%=1%

$P$(question response|non-dialogue)=5%×15%=0.75%.

Likewise, the selection probability of the associative response generation module 205b will be:

$P$(associative response|question)=10%×50%=5%

$P$(associative response|information provision)=40%× 25%=10%

$P$(associative response|request)=20%×10%=2%

$P$(associative response|non-dialogue)=30%× 15%=4.5%.

The selection probability of the example response generation module 205c, the selection probability of the sympathetic response generation module 205d, and the selection probability of the imitation response generation module 205e are calculated in a manner similar to the above.

The generation module determination unit 203 searches for the selection probability (P (question response|question)=35% in the above example) which is the largest value among the selection probabilities calculated in this way, and selects the response corresponding to this value (in the above example, the question response generation module 205a). Then, the generation module determination unit 203 acquires the response speech generated by the selected response generation module (e.g., "It will be sunny followed by clouds"), and uses this response speech as the output speech.

When the selected response generation module does not generate a response speech, the response generation module indicating the next largest selection probability is selected, and the response speech generated by this response generation module is used as the output speech. When there are a plurality of selection probabilities having the same largest value, the generation module determination unit 203 may randomly select one of the response generation modules corresponding to these largest values.

According to such a method of calculating the selection probability and determining the output speech, the selection variation of the output speech for the input speech is increased, so that the dialogs can be diverse and unexpected. That is, even a small difference in the expression to talk to could make voices returned from the robot 100 different, thereby reducing the possibility that the user gets bored with the dialogue soon. It is particularly effective in chatty dialogues where the conversational ball is kept rolling, because diversity and unexpectedness become the core factors in continuing the dialogue.

In order to further exert the diversity and unexpectedness, the generation module determination unit 203 may extract the selection probability having a predetermined reference value or greater from the calculated selection probabilities, and randomly select one of the response generation modules corresponding to the extracted selection probability. For example, when the reference value of the selection probability is set to $P_0=35\%$, if the selection probability in which $P>P_0$ holds appears in the question response generation module 205a, the example response generation module 205c and the sympathetic response generation module 205d, the generation module determination unit 203 randomly selects one of these three generation modules.

When dialogues are continuously conducted, a calculation may be performed in such a way that the selection probability of the response generation module already selected in the series of dialogues becomes low. For example, the selection probability is calculated after multiplying the association probability by a past coefficient (number 0 or greater and less than 1) which changes depending on a frequency selected in the past or whether it has been selected the last time. In this way, when the selection probability of the already selected response generation module is calculated to be low, it is possible to avoid similar responses from being output.

Figure 4:
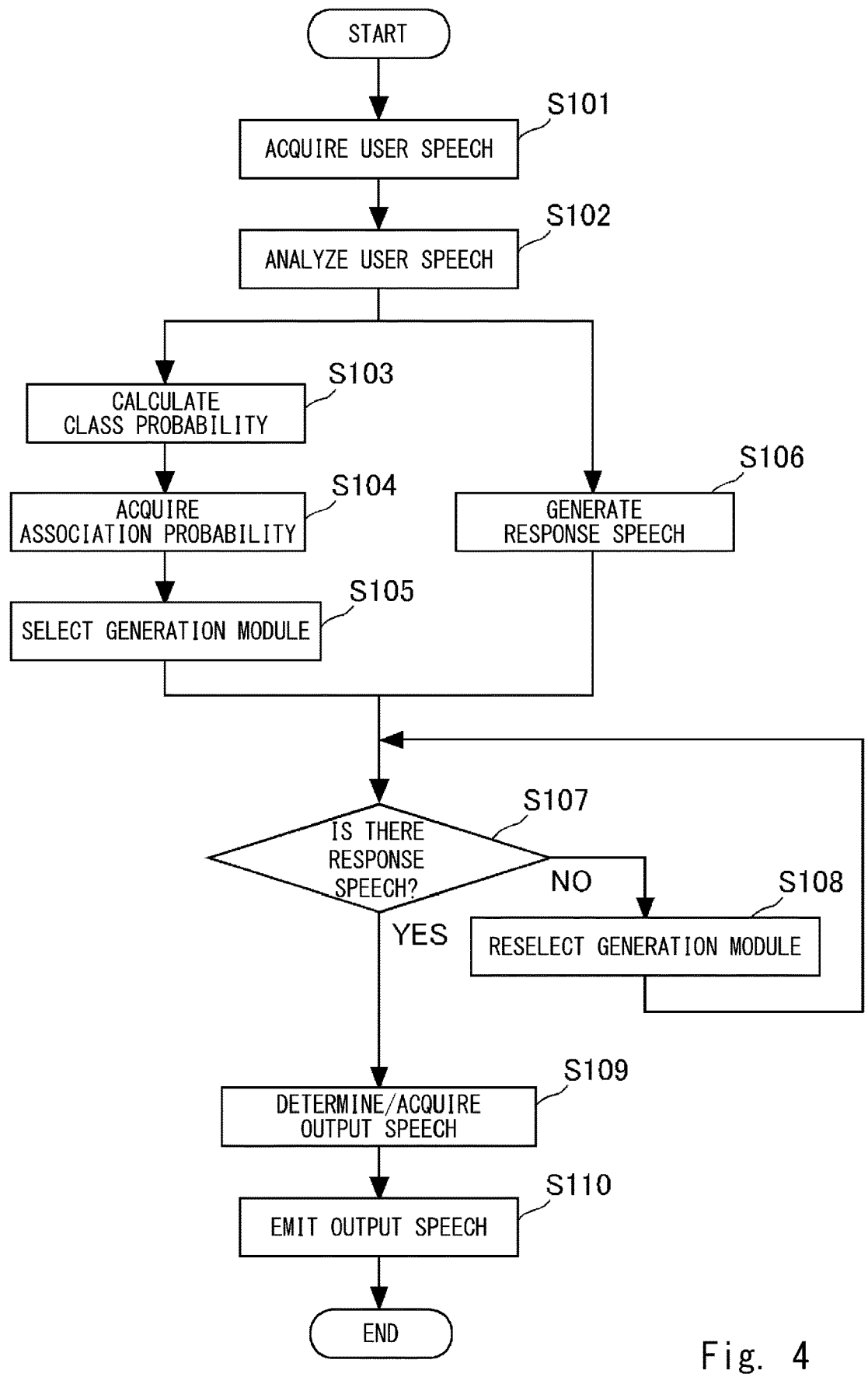
FIG. 4 is a flowchart showing processing from receiving a user's speech to responding to it.

Next, a flow of processing performed by the control unit 200 from the reception of the user's speech to the response thereto will be described. FIG. 4 is a flowchart showing processing from the reception of the user's speech to the response thereto. The flow of FIG. 4 shows processing from the user speaking one phrase to the robot 100 returning one phrase.

In Step S101, when the control unit 200 acquires the user's speech via the microphone 101, the speech analysis unit 201 serving as a functional block analyzes and recognizes the user's speech as the input speech in Step S102. The speech analysis unit 201 passes the recognized speech content to the class probability calculation unit 202 and the response generation module group 205.

In Step S103, the class probability calculation unit 202 calculates a class probability which is a probability that the input speech belongs to each of the classified classes. When the class probability calculation unit 202 calculates the class probabilities that the input speech belongs to the respective classified class, the class probability calculation unit 202 passes the values of the calculated class probabilities to the generation module determination unit 203.

In Step S104, the generation module determination unit 203 reads the reference table 231 from the memory 230 and acquires the association probability for each classified class of each response generation module. Then, in Step S105, one response generation module is determined from the response generation module group 205. The specific process flow of Step S105 will be described using FIG. 5.

Figure 5:
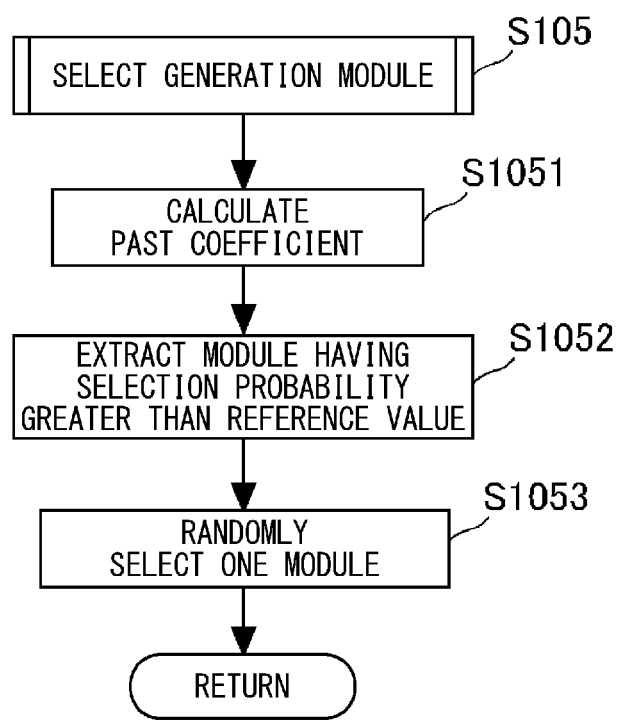
FIG. 5 is a flowchart showing a process of selecting a response generation module.

FIG. 5 is a sub-flow diagram showing a process of selecting the response generation module. In Step S1051, the generation module determination unit 203 first calculates the past coefficient. The past coefficient is calculated for each response generation module, and increases or decreases depending on the frequency at which the response generation module to be calculated is selected in the past and whether it has been selected the last time. The generation module determination unit 203 proceeds to Step S1052 where it searches for the selection probability P greater than the reference value $P_0$ from among the selection probabilities P obtained by multiplying the past coefficient, the association probability, and the class probability, and extracts the response generation module corresponding to the selection probability.

Then, in Step S1053, one of the plurality of extracted response generation modules is randomly selected. When there is only one selection probability P greater than the reference value $P_0$, the response generation module corresponding to the selection probability is selected. When there is no selection probability P greater than the reference value $P_0$, the response generation module corresponding to the selection probability having the largest value is selected.

Returning to the flow of FIG. 4, the description is continued. In Step S106, each response generation module of the response generation module group 205 receives the speech content recognized by the speech analysis unit 201, and generates a response speech that matches the response type of the corresponding response generation module. Step S106 may be performed in parallel to Steps S103 to S105, or may be performed before Step S102 or after Step S105.

The generation module determination unit 203 proceeds to Step S107 where it checks whether the response generation module selected in Step S105 has generated the response speech. When the response speech has not been generated (Step S107: NO), the process proceeds to Step S108, and the response generation module is reselected. For example, as described above, the response generation module having the next largest selection probability is selected. Alternatively, the generation module determination unit 203 may randomly select the response generation module from the remaining response generation modules.

When the response generation module selected in Step S105 has generated the response speech (Step S107: Yes), the process proceeds to Step S109 where the response speech is acquired and used as the output speech. In Step S110, the speech control unit 204 converts the output speech received from the generation module determination unit 203 into the voice signal and controls the speaker 102 to emit it. Then, a series of processes is completed. If there is another speech from the user again, the processes are repeated in a manner similar to the above. In the above process flow, an example in which all response generation modules generate the response speeches has been described. Alternatively, only the response generation module selected by the generation module determination unit 203 may generate the response speech after the selection. In this case, "GENERATE RESPONSE SPEECH" of Step S106 is performed after Step S105. When the selected response generation module generates the response speech, after it is selected, it is possible to save unnecessary processing such that the unselected response generation module generates the response speech. On the other hand, when each response generation module generates the response speech prior to the selection by the generation module determination unit 203, a quick response is achieved. These specifications may be determined according to the environment in which the robot 100 is used.

Figure 6:
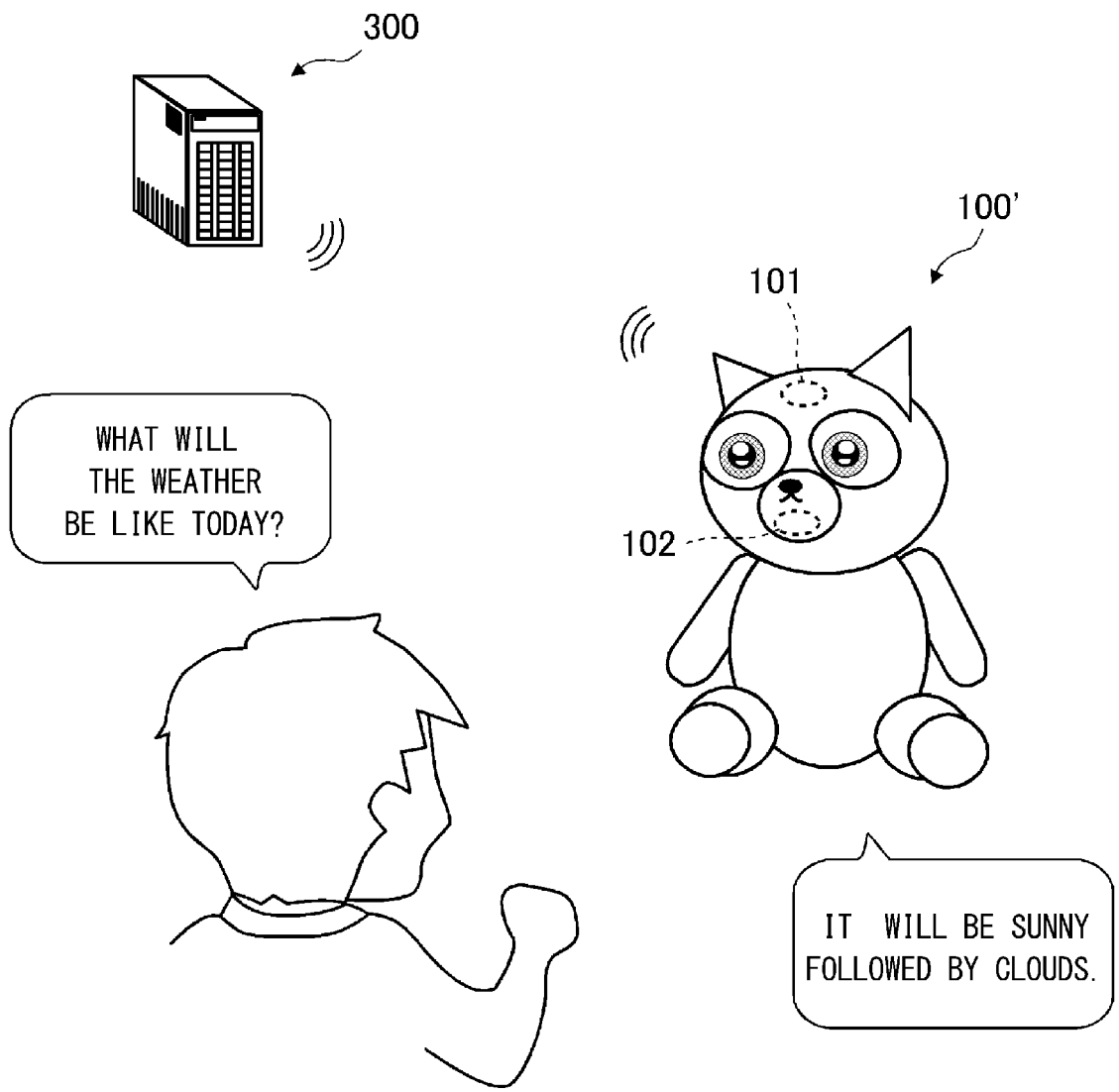
FIG. 6 is a view showing an example of communication between a robot and a user according to a second embodiment.

Next, a second embodiment will be described. FIG. 6 is a diagram showing an example of communication between a robot and a user according to the second embodiment, in the first embodiment, a main body includes all the main functional elements so that the robot 100 can communicate with the user alone. However, a robot 100' according to the second embodiment employs a configuration in which a server 300 is responsible for functional elements related to calculation.

For example, when the user speaks to the robot 100', "What will the weather be like today?", the microphone of the robot 100' captures the voice. The robot 100' converts the captured voice into a voice signal and transmits the voice signal to the server 300 by radio communication. The server 300 selects the voice data of the response voice (in the example of the drawing, "It will be sunny followed by clouds," using these pieces of information, and transmits it to the robot 100'. The robot 100' emits a voice corresponding to the received voice data from the speaker 102.

Figure 7:
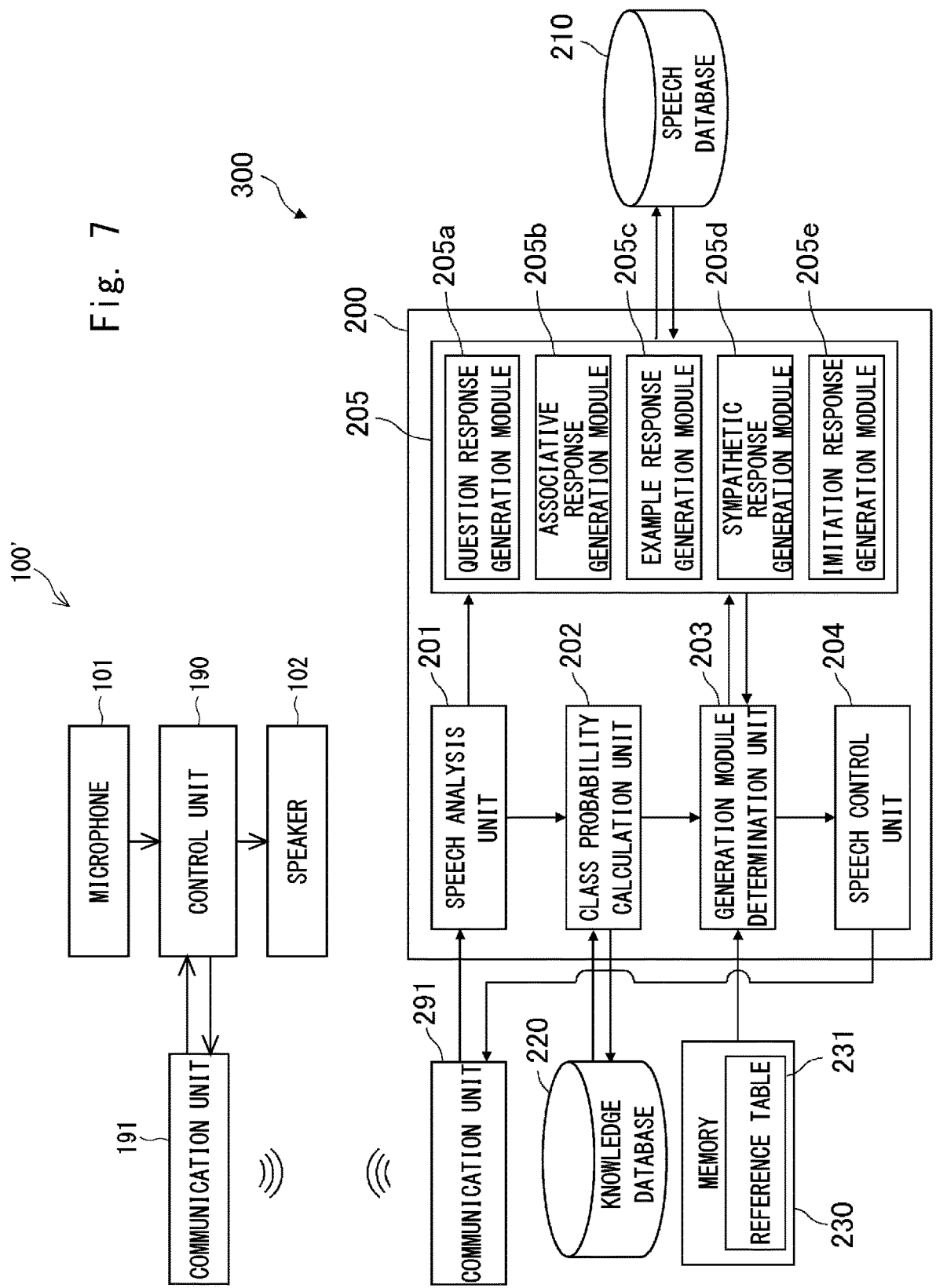
FIG. 7 is a system configuration diagram of the robot and a server.

FIG. 7 is a system configuration diagram of the robot 100' and the server 300. Components responsible for the same functions as those of the components described in the first embodiment in principle are denoted by the same signs, and the description of such functions is omitted. In this embodiment, the server 300 functions as an entity of a communication device that executes various operations, etc.

The robot 100' includes the microphone 101 and the speaker 102 in, the same manner as in the robot 100. The control unit 190 converts a voice signal received from the microphone 101 into voice data, and transmits the voice data to the server 300 via the communication unit 191. Further, the control unit 190 converts the voice data received via the communication unit 191 into a voice signal, and controls the speaker 102 to emit it. The communication unit 191 is a communication interface for exchanging the control signals and voice data with the server 300 via a network, and is, for example, a wireless LAN unit.

Like the robot 100, the server 300 includes the control unit 200, the speech database 210 the knowledge database 220, and the memory 230. Further, the communication unit 291 is a communication interface for exchanging the control signals and voice data with the robot 100 via the network. The communication unit 290 is, for example, a wireless LAN unit.

The speech analysis unit 201 receives the user speech as the input speech via the communication unit 291. Further, the speech control unit 204 passes the voice data of the output speech received from the generation module determination unit 203 to the communication unit 291.

Like the first embodiment, such a system configuration according to the second embodiment can achieve communication with the user. Further, by integrating the functions related to the calculation in the server 300, the configuration of the robot 100' can be simplified, and smooth communication can be possible even without including a high-performance control chip in the robot 100'. Further, when the server 300 is responsible for the functions related to the calculation, it can sequentially respond to a calculation request from the plurality of robots 100', thereby reducing the manufacturing cost of the entire system.

Figure 8:
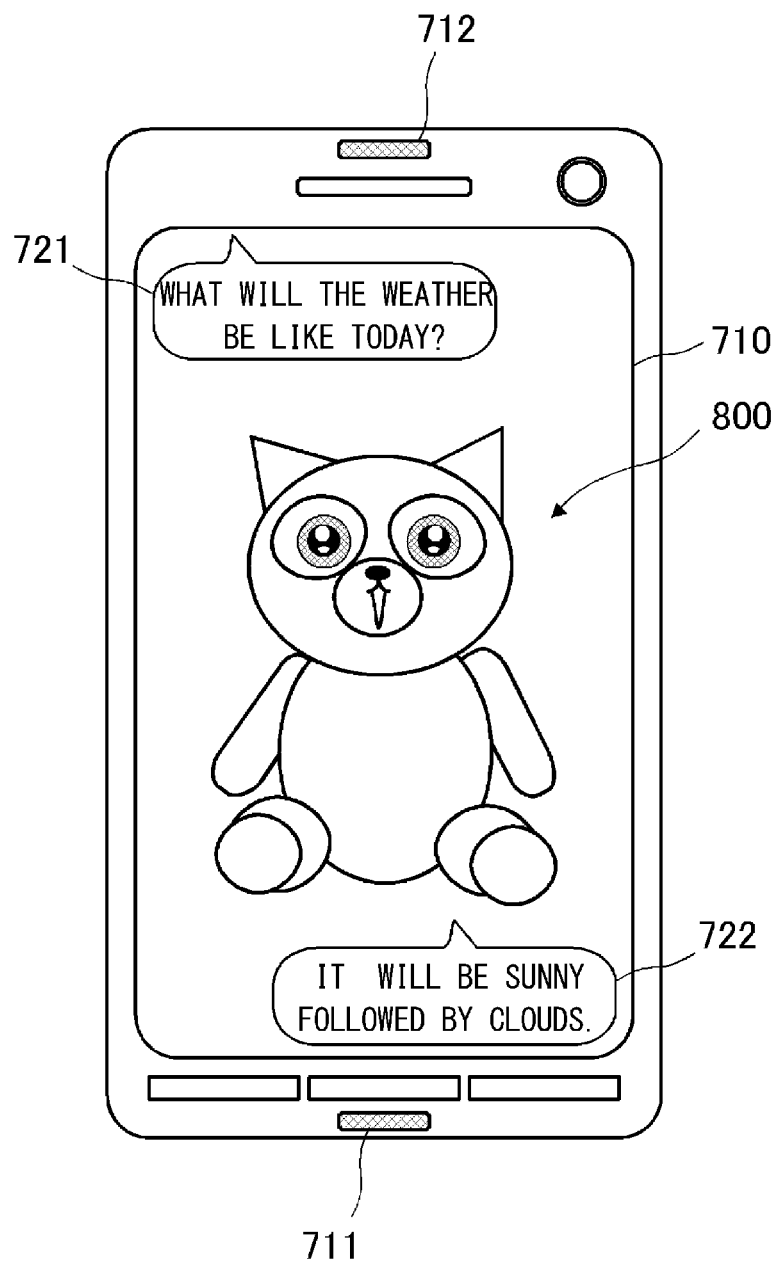
FIG. 8 is a view showing a smartphone according to a third embodiment.

Next, a third embodiment will be described. FIG. 8 is a diagram showing a smartphone 700 according to the third embodiment. In the first and second embodiments, the robots 100 and 100' embodying the character are partners which the user has a dialogue with. However, in the third embodiment, a video character 800 displayed on the smartphone 700 is a partner which the user has a dialogue with. When the robot embodies a character, the user would feel it like a pet and be more attached to it. The smartphone 700 can more easily express the character.

A system configuration of the smartphone 700 is almost the same as the system configuration of the robot 100 according to the first embodiment described with reference to FIG. 2. A configuration of the smartphone 700 different from that of the robot 100 will be described below, and descriptions of the common configuration is omitted.

The smartphone 700 includes a display panel 710, a microphone 711, and a speaker 712. The display panel 710 is, for example, a liquid crystal panel, and displays the video character 800. The microphone 711 is an element that replaces the microphone 101 in the first embodiment, and collects the user's spoken voices. The speaker 712 is an element that replaces the speaker 102 in the first embodiment, receives a voice signal converted by the speech control unit 204, and outputs an output speech.

Further, an input text window 721 slowing an input speech which is the user's speech is displayed on the display panel 710. The speech analysis unit 201 converts the input speech into a text to generate the input text window 721 and displays it on the display panel 710. Further, an output text window 722 showing the output speech, which is the selected response speech, in a text is displayed on the display panel. The speech control unit 204 converts the response speech sentence into a text to generate an output text window 722 and displays it on the display panel 710.

By displaying the input speech and output speech in text information in this manner, it is possible to visually confirm the dialogue. Further, when the voice output is turned off, the user can enjoy communication in a quiet environment without bothering people in the surroundings. Moreover, when the input speech is provided in a text using a text input function of the smartphone 700 instead of providing the input speech in a voice, the user can enjoy communication without using voices. In this case, both the input speech and the output speech are processed as the text information.

When the smartphone 700 is made to function as a communication device in this way, the user can more easily enjoy the dialogue with the character, because dedicated hardware serving as the communication device is not necessary. Moreover, when the smartphone 700 is configured in, such a way that the user can have a dialogue with the video character 800 in conjunction with another application of the smartphone 700, it can be incorporated into various applications. The smartphone 700 may be a system in which a server cooperates with the smartphone as in the second embodiment.

The program can be stored and provided to a computer using any type of non-transitory computer readable media. Non-transitory computer readable media include any type of tangible storage media, Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable). CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in, many ways. Such variations are not to be regarded as a departure from the spirit and scope of the disclosure, and all such modifications as would be obvious to one skilled in the art are intended for inclusion within the scope of the following claims.

What is claimed is:

1. A communication device comprising:
    an input unit configured to input an input speech that is a user's speech;
    a calculation unit configured to calculate class probabilities that are probabilities the input speech belongs to a plurality of respective classes previously defined as types of speech contents;
    a plurality of response generation modules provided for respective types of responses, each of the plurality of response generation modules configured to generate a response speech corresponding to one of the types of responses;
    a determination unit configured to select one of the plurality of response generation modules based on association probabilities and the class probabilities calculated by the calculation unit and determine response speech generated by the selected response generation module as an output speech to be emitted to the user, the association probabilities being set for each of the plurality of response generation modules, and each of the association probabilities indicating a level of association between one of the response generation modules and one of the plurality of classes; and
    an output unit configured to output the output speech.

2. The communication device according to claim 1, wherein the determination unit is configured to randomly select one response generation module having a selection probability, which is obtained by multiplying one of the association probabilities by one of the class probabilities, greater than or equal to a reference value from among the plurality of response generation modules.

3. The communication device according to claim 1, wherein the determination unit is configured to multiply a past coefficient, which is set in such a way that a probability of selecting a previously-selected response generation module becomes low, by one of the association probabilities and select one of the plurality of response generation modules.

4. The communication device according to claim 1, wherein the selected response generation module is configured to generate, after the determination unit selects the one of the plurality of response generation modules, response speech.

5. A non-transitory computer readable medium storing a control program of a communication device, the control program, when executed by a computer, causing the computer to execute:
    inputting an input speech that is a user's speech;
    calculating class probabilities that are probabilities the input speech belongs to a plurality of respective classes previously defined as types of speech contents;
    selecting one of a plurality of response generation modules based on association probabilities and the class probabilities calculated in the calculating, generating a response speech by the selected response generation module, and determining the response speech generated by the selected response generation module as an output speech to be emitted to the user, the association probabilities being set for each of the plurality of response generation modules, and each of the association probabilities indicating a level of association between one of the response generation modules and one of the plurality of classes; and
    outputting the output speech.

* * * * *